Feb. 21, 1956 H. KLEIMAN 2,735,505
FLEXIBLE PACKING IN SUPPLEMENTAL SOCKET
Filed June 2, 1952 3 Sheets-Sheet 1
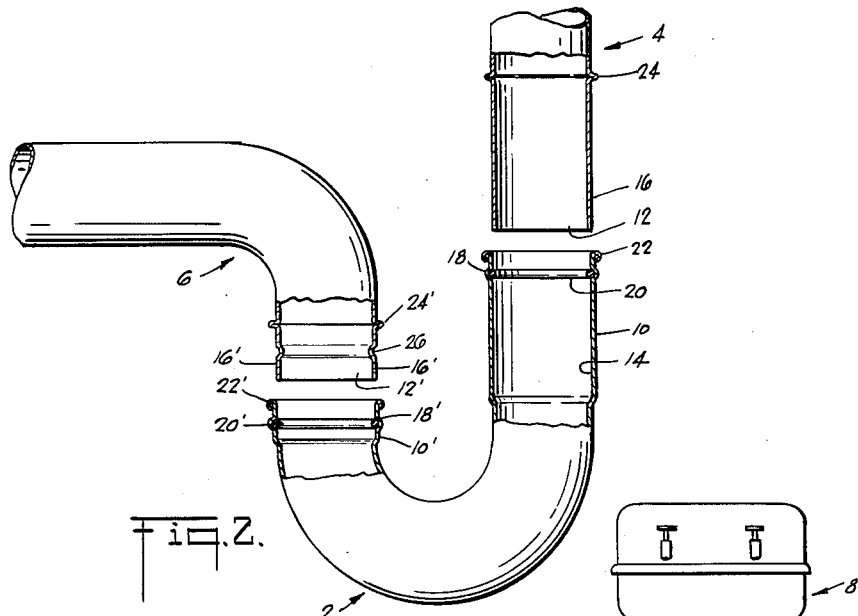
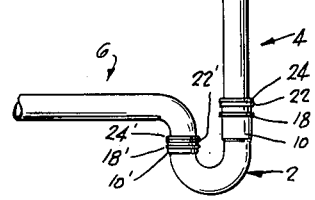
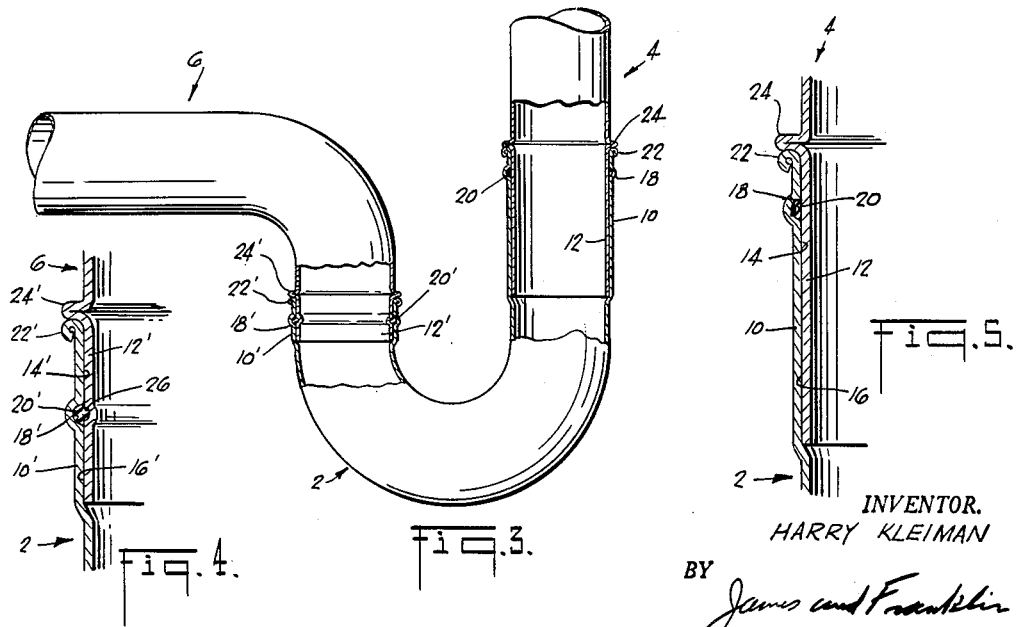
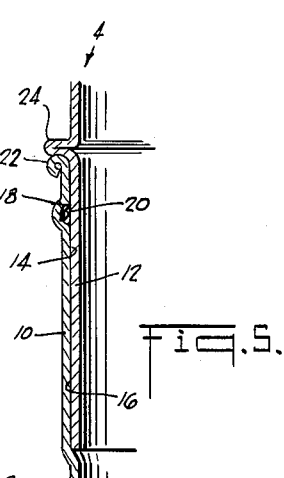
INVENTOR.
HARRY KLEIMAN
BY *James and Franklin*
ATTORNEYS

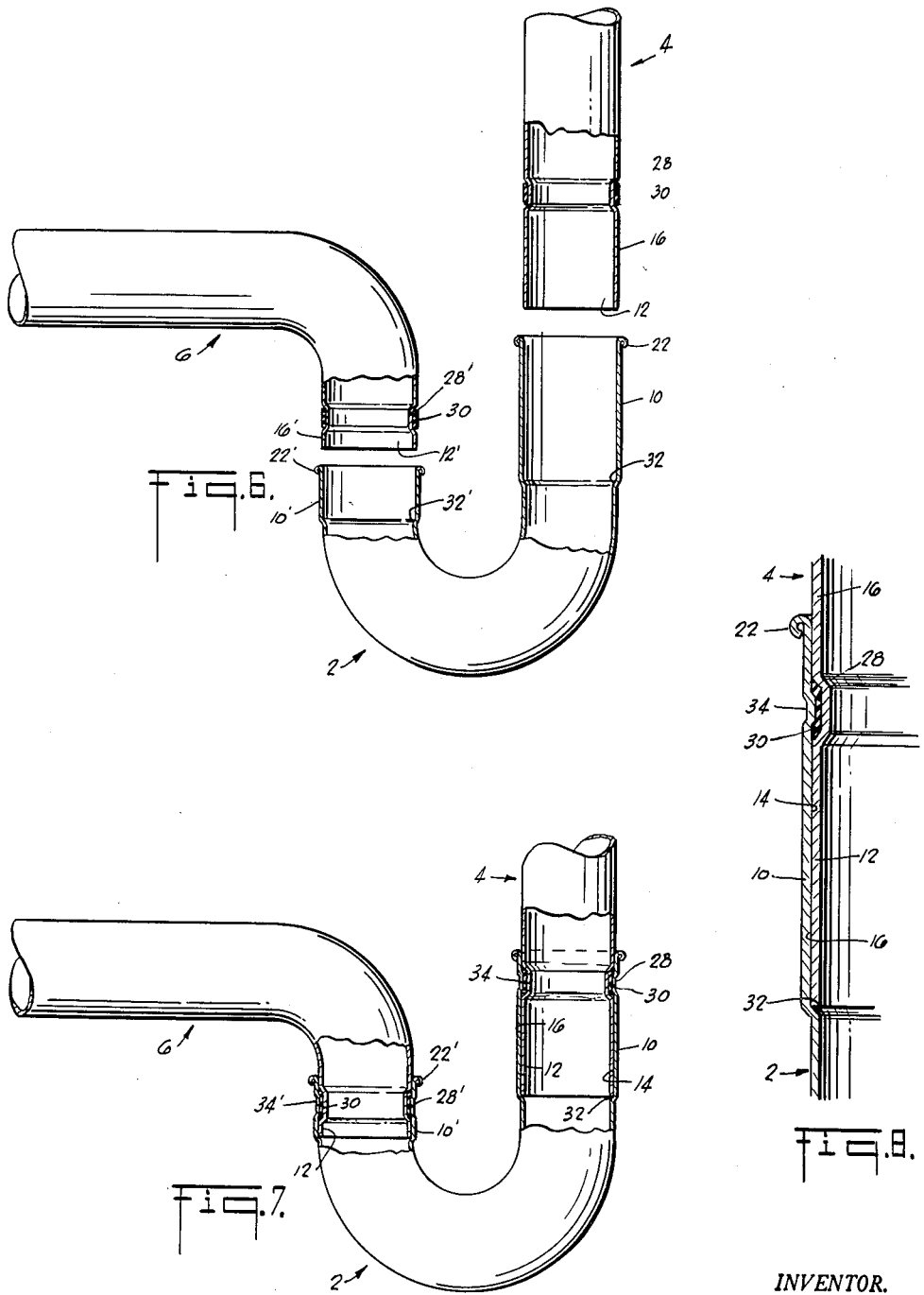

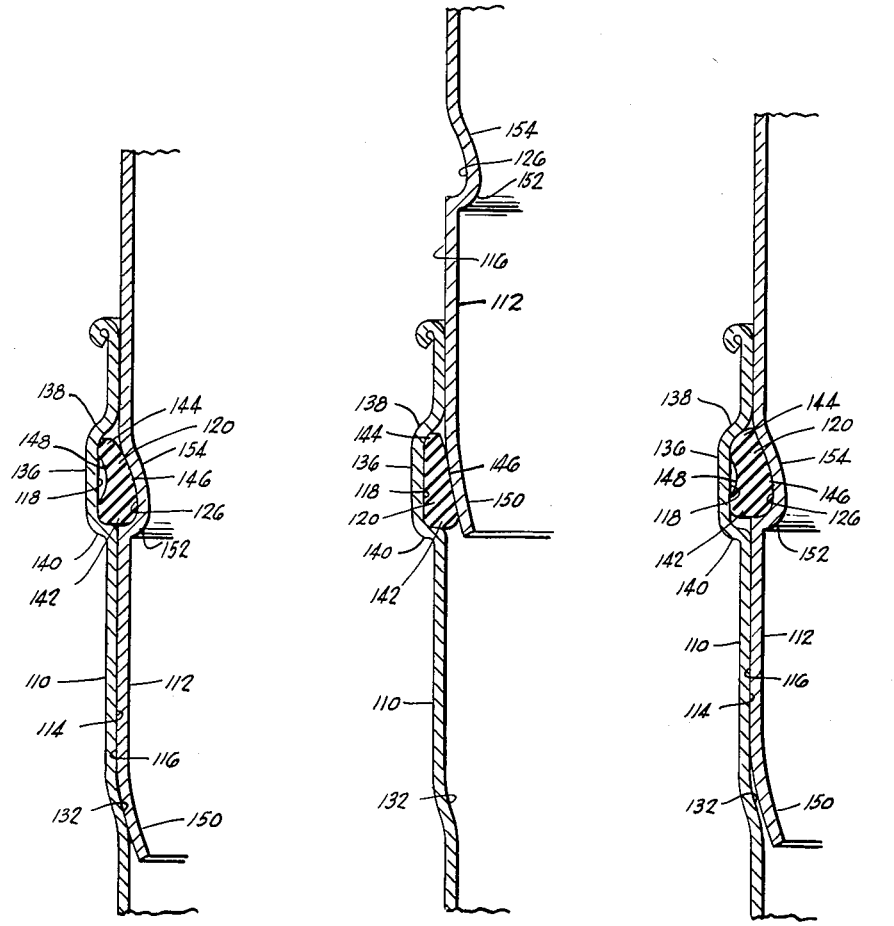

United States Patent Office 2,735,505
Patented Feb. 21, 1956

2,735,505

FLEXIBLE PACKING IN SUPPLEMENTAL SOCKET

Harry Kleiman, New York, N. Y.

Application June 2, 1952, Serial No. 291,269

3 Claims. (Cl. 182—7)

The present invention relates to a construction for providing an effective liquid and airtight seal at the joints of telescoping pipe sections. The invention is particularly adapted for use with thin-walled pipe sections of the type employed in the formation of sink traps and other similar household plumbing attachments.

The problem of producing an adequate air and water seal at the joints of telescoping pipe sections such as are employed in large numbers in more or less routine installations has long plagued the industry. Up until the present, proper joints were produced in a manner analogous to the sealing arrangements employed with heavy duty pipes. While this was not too onerous when comparatively thick walled pipes were used, it presented manifold problems of fabrication and expense when thin-walled brass tubing was employed for the fixtures in question. The conventional sealing arrangements for joints of the type under discussion involved providing an external thread on the female telescoping section and utilizing a separate internally threaded adapter ring which would fit over and engage the male pipe section and, when threaded onto the female pipe section, would compress a separate sealing ring against one or more of the pipe sections in question and hold the pipe sections in place. When thick-walled pipe was employed it was not too difficult a matter to provide an external thread on the female pipe section, but even that required a separate machining operation. When thin-walled tubing is used, it is necessary to employ a separate externally threaded ring which is secured to the exterior of the open end of the female pipe section as by soldering or the like.

It will be appreciated that merely the use of a multiplicity of individual and separate parts, required even with thick-walled pipe, represents a serious expense factor and in addition requires the stocking of a large number of items. When to this is added the consideration that it is a particularly ticklish matter insofar as production at any appreciable rate is concerned to secure an externally threaded ring onto the female telescoping tube section of thin-walled pipe, the disadvantages of the commonly used joining and sealing arrangements will be apparent. From the point of view of the plumber or installer, too, the sealing arrangement of the prior art has been essentially unsatisfactory. A multiplicity of assembling and fitting operations were required, most of which had to be performed step-wise if the various pipes were to be properly aligned and interfitted. Manufacturing variations often necessitated the trial and error use of a number of adapter rings in order to match screw threads and eliminate those whose threads were stripped. Even after the pipes had been properly assembled, it was sometimes necessary to completely disassemble them through no fault of the plumber but solely because the externally threaded ring on the outside of the female pipe section was improperly soldered to the pipe section and hence did not hold water. Nevertheless, over a period of many years the industry has adopted such arrangements, even though their unsuitability for use with thin-walled tubing, and their disadvantages even when used with thick-walled tubing, have been apparent and well realized by the art.

I have devised a sealing arrangement which avoids the above disadvantages and which is particularly well adapted for use with thin-walled tubing because of the readiness with which annular recesses may be formed in such tubing. My arrangement has, however, manifest advantages even when used with thick-walled tubing. In particular, it eliminates all separate parts other than the pipes themselves, and requires only the most rudimentary and easily accomplished assembling and disassembling operations. The telescoping pipe sections carry, as a fixed part thereof, the cooperating sealing instrumentalities. No threading operations are required. When a normal seal is desired all that the workman must do is telescope the pipe sections. They will remain assembled and will provide a first class seal, but can be separated if desired through the use of an appropriate tool. If an extremely strong seal is desired, the female telescoping pipe section may be inwardly deformed, through the use of a simple rolling tool.

The invention resides in the particular construction of the telescoping pipe sections and to the use in conjunction therewith of a sealing ring which engages the inner opposed surfaces of the telescoping pipe sections so as to define a seal therebetween. It is appreciated that it is old to use sealing rings in various applications. However, by reason of the particular pipe structures here employed the use of a sealing ring for the purposes and with the advantages above set forth is rendered feasible from a production and assembly point of view.

In one embodiment, the sealing ring is mounted within an annular recess extending around one of the opposed surfaces of the telescoping pipe sections and extends out from that recess so as to engage the opposed surfaces of the other pipe section when the pipes are telescoped, the sealing ring being compressed when it engages with said other opposed surfaces so as to define the seal. The compressive force is sufficiently great so as to prevent separation of the telescoping pipe sections except when a special tool is employed, interengaging flanges and beads being provided between which that tool may be inserted when it is desired to separate the pipes. A particularly advantageous modification of this embodiment involves the employment, in the second mentioned opposed surface, of another annular recess, preferably smaller than the first, into which a portion of the sealing ring is received when the pipe sections are telescoped. This modification is particularly useful where one of the pipe sections is to be rotatably adjusted with respect to the other. A still further modification, through the use of a sealing ring of novel configuration in conjunction with the specially designed annular recesses into which that ring is received, produces a very strong seal, permits the pipe sections to be readily telescoped with respect to one another, yet resists and prevents their separation once they have been telescoped. A second embodiment has the advantage of providing a much stronger seal, but has the disadvantage that when it is employed the pipe sections are not readily separable. In this embodiment the sealing ring is retained within an annular recess of appreciable axial length, the sealing ring also having an appreciable axial length, and after the pipes are telescoped the other pipe section is deformed into the sealing ring, this being readily accomplished through the use of a conventional rolling tool.

To the accomplishment of the above and to such other objects as may hereinafter appear the present invention relates to a pipe sealing structure as defined in the following claims and as described in this specification, taken together with the accompanying drawings, in which:

Fig. 1 is a front elevational view on a reduced scale of the present invention embodied in a sink trap;

Fig. 2 is a front elevational exploded view, partially broken away, showing the construction involved;

Fig. 3 is a view similar to Fig. 2 but showing the pipe sections in telescoped position;

Fig. 4 is a cross sectional view on an enlarged scale showing the manner in which the seal is produced at the left hand end of the J-bend;

Fig. 5 is a cross sectional view on an enlarged scale showing the manner in which the seal is achieved at the right hand end of the J-bend;

Fig. 6 is a view similar to Fig. 2 but showing a different embodiment of the invention;

Fig. 7 is a view similar to Fig. 6 but showing the pipe sections in telescoped position and with the female pipe section rolled inwardly;

Fig. 8 is a cross sectional view on an enlarged scale showing the manner in which the seal is produced in the embodiment of Fig. 7;

Fig. 9 is a cross sectional view on an enlarged scale showing still another embodiment of the present invention;

Fig. 10 is a cross sectional view showing the embodiment of Fig. 9 while the two pipe sections are in the process of being telescoped with respect to one another; and Fig. 11 is a cross sectional view showing the embodiment of Fig. 9 when an attempt is made to separate the two pipe sections.

The invention is here specifically disclosed as embodied in a sink trap, said trap consisting of a J-bend 2 into the long arm of which a tail piece 4 is telescoped and into the short arm of which a wall or floor bend 6 is telescoped. All of the pipes are made of thin walled brass tubing. By way of example, the thickness of the tube walls may be between .022 inch and .045 inch. The tail piece 4 leads from the drain of the sink 8 into the J-bend 2, and the wall or floor bend 6 leads from the J-bend 2 to the sewer. In making installations of this type of plumbing fixture the point at which the wall or floor bend 6 passes through the wall or floor of the room will differ from room to room and consequently the wall or floor bend 6 must be rotatable with respect to the J-bend 2, at least prior to final assembly.

Having reference first to the long arm of the J-bend 2, the upper extremity 10 of that arm is belled out so as to define an outer or female section into which the depending end section 12 of the tail piece 4 is telescopably receivable, the pipe sections 10 and 12 defining outer and inner telescoping pipe sections respectively having inwardly and outwardly facing opposed surfaces 14 and 16. In order to produce proper alignment of the pipes and to facilitate the attainment of a proper seal, the telescoping pipe sections 10 and 12 are adapted to fit fairly snugly.

The inner surface 14 of the pipe section 10 is provided with an annular recess 18 in which a sealing ring 20 is received, the major portion of the sealing ring being retained within the recess 18 but a portion of the sealing ring 20 extending inwardly beyond the inner surface 14 of the pipe section 10 so that when the inner pipe section 12 is telescoped with respect to the outer pipe section 10 the sealing ring 20 will engage with the outer surface 16 of the inner pipe section 12 and will be deformed or compressed thereby, thus forming a seal around the pipe joint. While a wide variety of materials can be used for the sealing ring 20, I have found that a resilient material such as that synthetic rubber which is sold commercially under the trade name "neoprene" gives very good results. The size of the sealing ring 20 and the annular recess 18 may be varied over wide limits, and the larger these elements are the better is the seal produced. For example, with a sealing ring 20 having a diameter of ⅛ inch and with a correspondingly dimensioned recess 18, a seal is produced merely by telescoping the two pipe sections 10 and 12 which is capable of withstanding a pressure of ten pounds per square inch of air without leakage, while when the sealing ring and the annular recess have a diameter of ¼ inch, an air pressure of approximately 40 pounds per square inch is retained. The hardness of the sealing ring also plays a part in the effectiveness of the sealing action, the harder the ring the greater the pressure which can be contained thereby. However, it will be understood that the sealing ring 20 must be sufficiently soft so that the pipe sections 10 and 12 may be telescoped without damage or deformation. It will also be understood that although the sealing ring 20 is illustrated in Figs. 1–5 as being circular in cross section, that configuration is not essential. To specify only a few examples of the many shapes which are permissible, the ring 20 could have an elliptical or even substantially rectangular cross section and could extend for a substantial distance axially of the pipe sections 10 and 12.

Because of the firmness with which the sealing ring 20 grips the outer surface 16 of the inner pipe section 12, special means must be provided for facilitating the separation of the tail piece 4 from the J-bend 2 when that is required. Therefore the upper end of the outer pipe section 10 is provided with an outwardly projecting flange 22 formed by rolling the thin material of which the pipe is formed, and the tail piece 4 is provided with a bead 24 at the top of the telescoping section 12, the bead 24 also being formed integrally with the side walls of the pipe itself. The bead 24 is adapted to engage and seat on top of the flange 22 when the pipe sections 10 and 12 are telescoped. This serves to limit the relative positions of the pipe sections 10 and 12 when they are telescoped, and further provides means by which the pipe section 12 can be withdrawn from the pipe section 10, a tool of progressive thickness being interposed between the flange 22 and bead 24 so as to pry or wedge the pipe section 12 axially out of the pipe section 10.

The construction shown at the short arm of the J-bend 2 represents a modification of that just described, said modification being particularly adapted for use where one of the pipes, such as the wall or floor bend 6, must be rotatably adjustable with respect to the J-bend 2. There the outer surface 16' of the inner telescoping pipe section 12' is itself provided with an annular recess 26 adapted, when the bead 24' seats on the flange 22' and fixes the telescoped positions of the pipe sections 10' and 12', to register with the annular recess 18' in which the sealing ring 20' is received and retained. Hence that portion of the sealing ring 20' which extends inwardly from the inner surface 14' of the outer pipe section 10' is received and compressed within the recess 26. Because the sealing ring 20' will not be compressed or deformed to as great a degree as the sealing ring 20, the inner pipe section 12' will not be as strongly frictionally held as was the inner pipe section 12, and consequently the pipe section 12' can be rotated about its axis with respect to the pipe section 10' more readily than was the case with the pipe section 12. The sealing effect of the ring 20' is not materially adversely affected because of the sinuous path along which it engages the outer surface 16' of the inner pipe section 12'. In order to further improve the sealing action it is preferred that the recess 26 be smaller than the recess 18', thus giving rise to increased compression or deformation of the sealing ring 20' therewithin. For example, if the recess 18' should have a diameter of ⅛ inch, the recess 26 might have a diameter on the order of ¹⁄₁₆ inch. The pipe sections 10' and 12' are adapted to be separated in the same manner as the pipe sections 10 and 12.

The mode of connection illustrated in Figs. 6, 7 and 8 will produce a much stronger seal, capable of containing air pressures on the order of several hundred pounds per square inch. According to that construction the outer surfaces 16 and 16' of the inner pipe sections 12 and 12' respectively are provided with annular recesses 28 and 28' respectively which have an appreciable width in the direction of the axes of the pipe sections, and a flat sealing ring 30, also of appreciable width, is received and retained within each of the respective recesses 28 and 28'. The thickness of the sealing rings 30 is such, in conjunction with the depth of the recesses 28 and 28', that the outer surfaces of the sealing rings 30 are substantially flush with the outer surfaces 16 and 16'. Hence telescoping of the inner pipe sections 12 and 12' with respect to the outer pipe sections 10 and 10' is facilitated. The degree of telescoping movement is limited by the engagement of the lower end of the inner pipe sections 12 and 12' with the shoulders 32 and 32' formed at the bottom of the outer pipe sections 10 and 10' where they join the body of the J-bend 2. After the tail piece 4 and the wall or floor bend 6 have had their sections 12 and 12' respectively telescoped into the outer sections 10 and 10' respectively of the J-bend 2, those outer sections 10 and 10' are rolled inwardly along a line in registration with the sealing rings 30, the thin walled material of the pipes in question facilitating this operation, which may be carried out by any conventional rolling tool. As is clearly shown in Fig. 8, the inwardly rolled or deformed portions 34 of the outer pipe sections 10 and 10' themselves have an appreciable width, although less than and symmetrically arranged with respect to the recesses 28 and 28'. They engage with and deform and compress the sealing ring 30, thus producing an extremely effective seal. However, because the inner and outer diameters of the telescoping pipe sections are closely the same, the inwardly rolled portions 34 of the outer pipe sections 10 and 10' in effect interlock with the recesses 28 and 28', thus preventing disassembly of the joined pipe sections.

The embodiment of Figs. 9–11 is also specifically designed for "heavy duty" installations and is capable of containing air pressures on the order of 200 pounds per square inch without leakage. It has the advantage over that disclosed in Figs. 6–8 that the pipes can be assembled and the seal produced merely by telescoping one pipe within the other. The outer pipe section 110 has an annular recess 118 in its inwardly facing surface 114, said recess being defined by side wall 136 and top and bottom walls 138 and 140 respectively which extend substantially at right angles from the side wall 136 so as to define ledges on which the upper and lower ends of the sealing ring 120 are adapted to seat. The sealing ring 120 is essentially triangular in shape, having a wide base 142 and a narrow upper portion 144, the inwardly extending surface 146 being upwardly and outwardly inclined from the base 142 to the upper portion 144. The outwardly disposed surface 148 of the sealing ring 120, which surface opposes the side wall 136 of the recess 118, is concave, so as to define an annular gap between the wall 136 and the surface 148. The base 142 of the sealing ring 120 is considerably wider than the depth of the recess 118, and consequently when the sealing ring 120 is placed in the recess 118 the base 142 will extend inwardly well beyond the inner opposed surface 114 of the pipe section 110. The sealing ring base 142 is adapted to rest on the bottom wall 140 of the recess 118, and if desired the upper end 144 of the sealing ring 120 may be somewhat short of the top wall 138 of the recess 118, thus allowing some axial play of the sealing ring 120 within the recess 118.

The inner pipe section 112 has a leading end which is inwardly tapered at 150, the inwardly tapered portion 150 being adapted to seat on the shoulder 132 formed at the bottom of the outer pipe section 110, thus limiting the degree of telescoping motion of the pipe sections 110 and 112. The pipe section 112 is also provided with an annular recess 126 in the outer opposed surface 116 thereof, said recess being defined by a bottom wall 152 which extends substantially at right angles to the wall of the pipe section 112 so as to define a ledge, and an upwardly and outwardly tapered side wall 154 which merges with the inner pipe section 112 at its upper extremities. The inclination of the side recess wall 154 is similar to that of the side surface 146 of the sealing ring 120, the recess 126 being so positioned on the inner pipe section 112 that it is in registration with the recess 118 when the pipe sections 110 and 112 have been completely telescoped.

As may be seen from Fig. 10, when the pipe sections 110 and 112 are being assembled the inwardly tapered end 150 of the inner pipe section 112 will engage the outer surface 146 of the sealing ring 120 and compress it outwardly with a cam action. Since the sealing ring 120 is of an appreciable size, being for example ½ inch in length and ¼ inch at its point of maximum thickness, the compressive effect will be marked. However, the telescoping action is permitted because the sealing ring 120 will be deformed so as to fill up the gap which previously existed between the recess side wall 118 and the concave sealing ring surface 148. In addition, the sealing ring 120 may also expand axially in an upward direction.

When the pipe section 112 has been fully telescoped with respect to the pipe section 110 the bottom wall 152 of the recess 126 will be opposite the bottom wall 140 of the recess 118 and the sealing ring 120 will then resiliently resume its original shape, the sealing ring base 142 extending across the seam between the pipe sections 110 and 112 and the inner surface 146 of the sealing ring 120 engaging the wall 154 of the recess 126, the outer edges of the sealing ring 120 engaging wall portions of the recess 118 so as to define a seal. If pressure should develop within the pipe sections, that pressure, in tending to escape between the pipe sections, must act upwardly through the seam between the pipe sections and against the base 142 of the sealing ring 120. This force will therefore urge the sealing ring upwardly, and this in turn will result in increased compression of the sealing ring 120 within the tapered channel which houses it. Thus despite the fact that the sealing ring 120 may be somewhat loosely received in the recess 118, it is capable of effective sealing action against pressures of appreciable magnitude, the sealing ring 120 automatically adapting itself to the pressure exerted thereon so as to produce an appropriate sealing effect.

Fig. 11 illustrates the position which the various parts of this embodiment assume when it is attempted to separate the pipe sections 110 and 112. The ledge-like bottom wall 152 of the recess 126 engages the base 142 of the sealing ring 120 and axially compresses the ring 120, the ring thus resisting the movement of the pipe section 112 so as to prevent its separation from the pipe section 110.

It will be appreciated by those skilled in the art that the seal produced in the embodiment of Figs. 1–5, which is capable of withstanding 10 pounds per square inch or more of air pressure, is entirely adequate for plumbing installations of the type under discussion, and the seal produced in the embodiments of Figs. 6–11, which are capable of withstanding air pressures on the order of 100 pounds per square inch or more, are suitable for use even in many so called "heavy-duty" installations. Assembly of pipe sections according to the embodiment of Figs. 1–5 is an extremely simple matter—the pipe sections need merely be telescoped with respect to one another. In the embodiments of Figs. 6–8 another simple operation is required, to wit, the rolling in of a portion of the outer pipe sections 10 or 10'. In the embodiment of Figs. 9–11 only a telescoping action is required. In fabrication of the pipe sections of any of the embodiments, all that is necessary is to insert the packing ring 18, 18', 30 or 120 in its appropriate recess. No loose parts, such as the gaskets and adaptor rings of the prior art, need be employed. No complicated and troublesome assembling operations, such as the soldering of externally threaded rings to the ends of the tubing, is involved. A measure of the importance of the constructions here described from a production point of view can be gleaned from the fact that for a single sink trap assembly comprising a J-bend, tail piece and wall or floor bend, a saving of as much as thirty cents per unit is realized through the practice of the instant invention, this saving being a substantial proportion—almost 25%— of the cost of the entire unit.

It will be understood that many variations may be made in the details of the instant invention without departing from the spirit thereof, as defined in the following claims.

I claim:

1. A sink trap comprising a J-bend pipe and a communicating pipe, both being of one-piece construction, formed of thin-walled tubing and one being telescopable with respect to the other, the inner and outer telescoping pipe sections having outwardly and inwardly facing opposed surfaces respectively with substantially the same diameter so as to be a snug fit one within the other, said opposed surfaces each having a registering annular recess of fixed dimension therearound each opening toward the other, and a ring of sealing material in one of said recesses and projecting out therefrom toward said other recess and compressively received therein so as to seal the joint between said two pipe sections when they are telescoped, the outer telescoping pipe section being wider than the remainder of the pipe of which it is a part, an internal abutment being defined at its point of junction with said remainder of said pipe, the end of said inner telescoping pipe section engaging said abutment when said sections are telescoped and when said annular recesses are in registration, said engagement defining a ground seal, said annular recess in the outer of said opposed surfaces being elongated in the direction of the longitudinal axis of said surfaces, said sealing ring also being elongated in said direction, the outer surface of said sealing ring which is received within said annular recess being provided with a groove extending around said ring, an annular opening thus being defined between said outer ring surface and the inwardly facing surface of said recess.

2. The plumbing fixture of claim 1, in which the inner side surface of said sealing ring inclines generally inwardly in the direction of telescoping motion of said inner pipe section, and in which the leading side surface of said inner pipe section is inwardly tapered.

3. A sink trap comprising a J-bend pipe and a communicating pipe, both being of one-piece construction, formed of thin-walled tubing and one being telescopable with respect to the other, the inner and outer telescoping pipe sections having outwardly and inwardly facing opposed surfaces respectively with substantially the same diameter so as to be a snug fit one within the other, said opposed surfaces each having a registering annular recess of fixed dimension therearound each opening toward the other, and a ring of sealing material in one of said recesses and projecting out therefrom toward said other recess and compressively received therein so as to seal the joint between said two pipe sections when they are telescoped, said sealing ring having a shape in cross section which is tapered toward the open end of said outer pipe section, one of said recesses being tapered corresponding to the taper of said sealing rings, whereby pressure of said ring in the direction of the open end of said outer pipe section by fluid entering through the seam between said telescoping pipe sections will cause said ring to become more compressed and thus will increase its effective sealing action, said sealing ring being received within the recess in said outer pipe section, the side surface of said ring within said recess being concave so as to define a gap between said side surface and the side wall of said recesses, the end of said inner pipe section being inwardly tapered so as to define a cam surface adapted to compress said ring as said pipe sections are telescoped, said gap facilitating outward deformation of said ring during the telescoping movement.

References Cited in the file of this patent

UNITED STATES PATENTS

| | | |
|---|---|---|
| 332,035 | Bagaley | Dec. 8, 1885 |
| 906,849 | Baashuus | Dec. 15, 1908 |
| 1,123,705 | Dehn | Jan. 5, 1915 |
| 1,450,956 | Gottsch | Apr. 10, 1923 |
| 1,538,007 | Schellin | May 19, 1925 |
| 2,453,391 | Whittingham | Nov. 9, 1948 |
| 2,457,105 | Patterson | Dec. 21, 1948 |
| 2,457,908 | Meyerhoeffer | Jan. 4, 1949 |
| 2,562,014 | Buhayar | July 24, 1951 |